(12) United States Patent
Shen

(10) Patent No.: US 7,049,996 B1
(45) Date of Patent: May 23, 2006

(54) METHOD AND APPARATUS OF TWO STAGE SCALING AND QUANTIZATION FOR CODED COMMUNICATION SYSTEMS

(75) Inventor: Qiang Shen, San Diego, CA (US)

(73) Assignee: Via Telecom Co., Ltd., San Diego, CA (US)

( * ) Notice: Subject to any disclaimer, the term of this patent is extended or adjusted under 35 U.S.C. 154(b) by 106 days.

(21) Appl. No.: 10/987,343

(22) Filed: Nov. 12, 2004

(51) Int. Cl.
*H04N 7/26* (2006.01)

(52) U.S. Cl. .................................. 341/200; 375/240.03

(58) Field of Classification Search ................ 341/200, 341/161, 160; 375/240.03, 244, 245
See application file for complete search history.

(56) References Cited

U.S. PATENT DOCUMENTS 5,543,844 A * 8/1996 Mita et al. ............... 375/240.2
5,959,675 A * 9/1999 Mita et al. ............. 375/240.04
2003/0202582 A1 * 10/2003 Satoh .................... 375/240.03

* cited by examiner

*Primary Examiner*—John B. Nguyen
(74) *Attorney, Agent, or Firm*—Christopher P. Maiorana, PC

(57) ABSTRACT

An apparatus comprising a first quantizer circuit, a memory and a second quantizer circuit. The first quantizer circuit may be configured to generate a first intermediate signal in response to (i) an input signal and (ii) a first scaling signal. The memory may be configured to (i) store the first intermediate signal and (ii) present a second intermediate signal, in response to an address signal. The second quantizer circuit may be configured to generate an output signal in response to (i) the second intermediate signal and (ii) a second scaling signal. The second quantizer circuit has a bit-width greater than the bit-width of the first quantizer circuit.

19 Claims, 3 Drawing Sheets

METHOD AND APPARATUS OF TWO STAGE SCALING AND QUANTIZATION FOR CODED COMMUNICATION SYSTEMS

FIELD OF THE INVENTION

The present invention relates to communication systems generally and, more particularly, to a method and/or apparatus for implementing two stage scaling and quantization for coded communication systems.

BACKGROUND OF THE INVENTION

To achieve better performance in a conventional digital communication system employing channel coding, decoder inputs are implemented as variables that reflect the reliability of the received data. This is sometimes referred to as soft decoding. Another type of decoding, sometimes referred to as hard decoding, uses only the sign of the received coded symbol as an input. To provide such a soft input to a decoder, the received coded symbol is usually quantized to be represented with a certain number of bits. The more bits used, the higher the quantization accuracy. However, implementing more bits uses more resources to store and process the additional bits.

Conventional coded systems also implement interleaving to improve error rate performance, especially in fading channels. The interleaved data is the soft value after demodulation. The size of the interleaver memory is determined by the coded symbol frame size and the bit-width of each soft symbol. For a higher data rate, the size can be significant in the overall receiver cost consideration.

A common configuration for a digital receiver is that the demodulator output is quantized into certain number bits (e.g., n). The whole frame of the coded symbols, each represented by the n bits, are stored into the deinterleaver memory. The deinterleaver reads the data out in a different order and feeds the data to a channel code decoder. The parameter n controls the size of the deinterleaver and the input bit-width of the decoder. Decreasing the parameter n reduces the size of the deinterleaver and decoder, but tends to degrade the decoding performance.

It would be desirable to implement a system that uses multi-stage quantization and/or scaling to decrease overhead and improve performance compared to conventional approaches.

SUMMARY OF THE INVENTION

The present invention concerns an apparatus comprising a first quantizer circuit, a memory and a second quantizer circuit. The first quantizer circuit may be configured to generate a first intermediate signal in response to (i) an input signal and (ii) a first scaling signal. The memory may be configured to (i) store the first intermediate signal and (ii) present a second intermediate signal, in response to an address signal. The second quantizer circuit may be configured to generate an output signal in response to (i) the second intermediate signal and (ii) a second scaling signal. In general, the second quantizer circuit has a bit-width greater than the bit-width of the first quantizer circuit.

The objects, features and advantages of the present invention include providing a quantizer system that may (i) achieve optimum error performance in a fading channel without increasing interleaving memory size, (ii) use slow changing physical channel information to scale a high rate decoder input, and/or (iii) be implemented as a multi-stage quantization method and/or apparatus.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
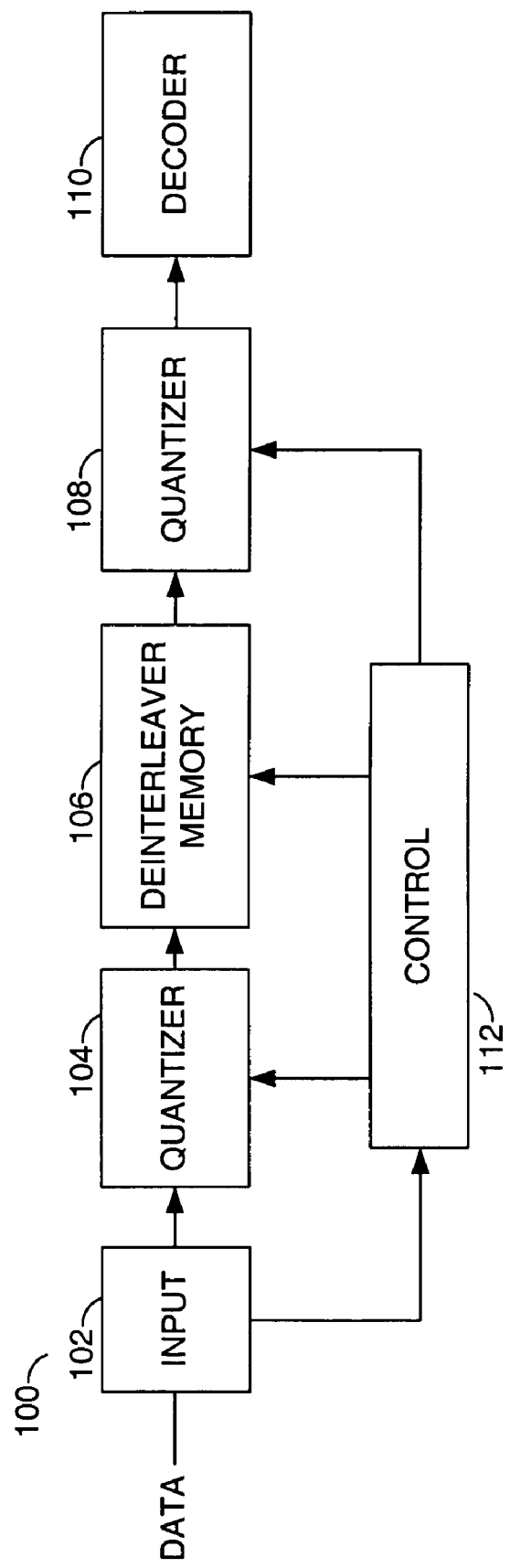
FIG. 1 is a block diagram of a receiver implementing two stage quantization in accordance with a preferred embodiment of the present invention.

Referring to FIG. 1, a block diagram of a circuit 100 is shown in accordance with a preferred embodiment of the present invention. The circuit 100 generally comprises a block (or circuit) 102, a block (or circuit) 104, a block (or circuit) 106, and a block (or circuit) 108, a block (or circuit) 110 and a block (or circuit) 112. The circuit 102 may be implemented as an input circuit. The circuit 104 may be implemented as a quantization circuit. The circuit 106 may be implemented as a memory. The circuit 108 may be implemented as a quantization circuit. The circuit 110 may be implemented as a decoder circuit. The circuit 112 may be implemented as a control circuit. The present invention may implement two stages of quantization. The quantizer circuit 104 generally has a first bit-width. The quantizer circuit 108 generally has a second bit-width that is greater than the first bit-width for the quantizer circuit 104.

Figure 2:
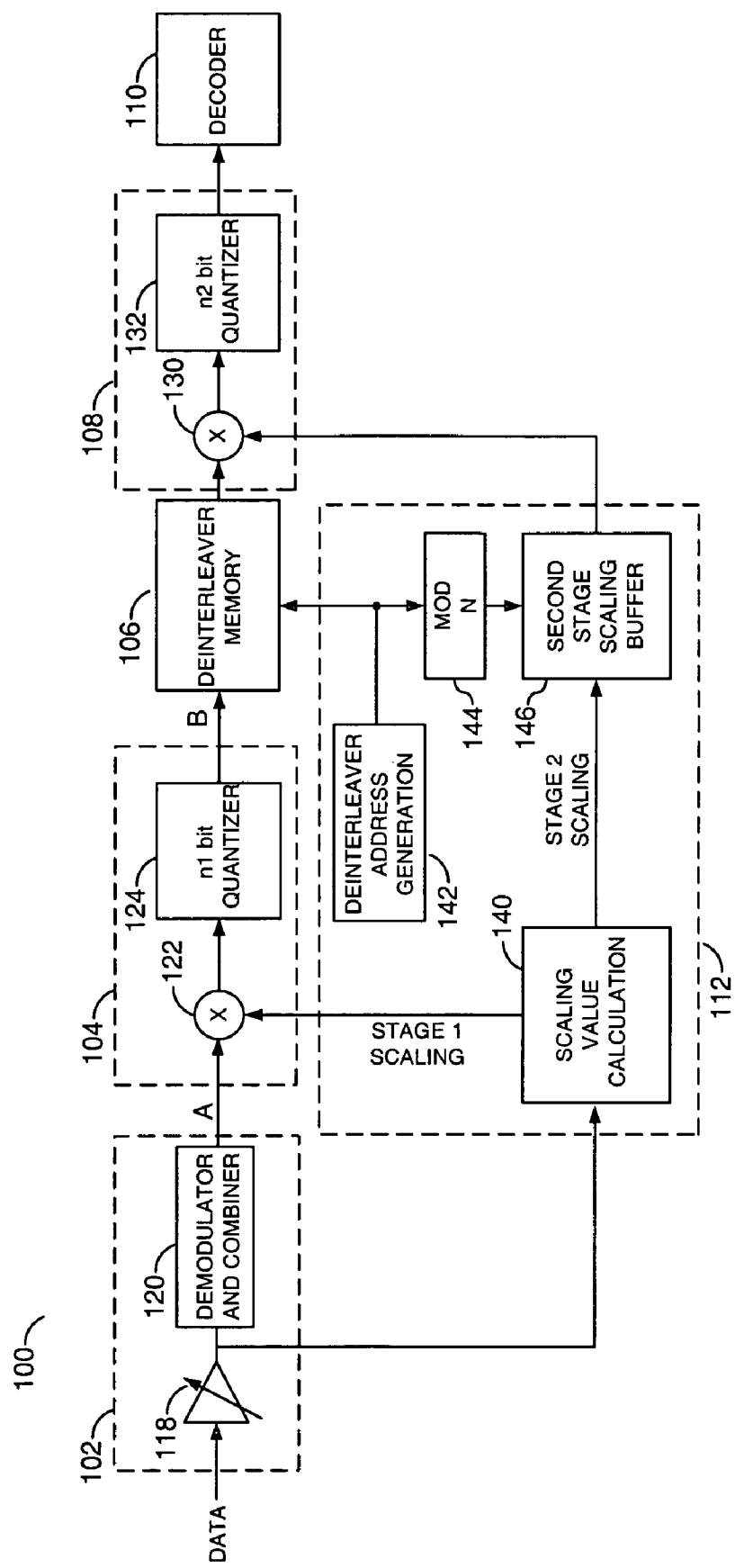
FIG. 2 is a more detailed block diagram of the present invention.

Referring to FIG. 2, a more detailed diagram of the circuit 100 is shown. The circuit 102 generally comprises a block (or circuit) 118 and a block (or circuit) 120. The circuit 118 may be implemented as an automatic gain control circuit. The circuit 120 may be implemented as a demodulator and combiner circuit. While the circuit 102 is shown comprising the circuit 118 and the circuit 120, other circuits may also be implemented. For example, the circuit 102 may also include a frequency conversion circuit, an analog to digital conversion circuit, etc. However, the additional circuitry is not generally necessary for the understanding of the present invention and has been omitted for clarity.

The circuit 104 generally comprises a block (or circuit) 122 and a block (or circuit) 124. The circuit 122 may be implemented as a multiplier circuit. The circuit 124 may be implemented as a quantizer circuit. In one example, the circuit 124 may be implemented as a n1-bit quantizer circuit.

The circuit 106 may be implemented as a memory, such as a deinterleaver memory. The circuit 108 generally comprises a block (or circuit) 130 and a block (or circuit) 132. The circuit 130 may be implemented as a multiplier circuit. The circuit 132 may be implemented as a quantizer circuit. In one example, the circuit 132 may be implemented as a n2-bit quantizer circuit. The circuit 110 may be implemented as a decoder circuit.

The circuit 112 generally comprises a block (or circuit) 140, a block (or circuit) 142, a block (or circuit) 144 and a block (or circuit) 146. The circuit 140 may be implemented as a scaling value calculation circuit. The circuit 142 may be implemented as a deinterleaver address generation circuit. The circuit 144 may be implemented as a modular operator circuit. The circuit 144 may perform an out=in mod N operation. The circuit 146 may be implemented as a second stage scaling buffer circuit.

An input signal (e.g., DATA) may be received by the automatic gain control (AGC) circuit 118 of the circuit 102. The circuit 102 presents an intermediate signal (e.g., A) to the circuit 104. The circuit 104 presents an intermediate signal (e.g., B) to the circuit 106. The demodulator circuit 120, depending on the signaling design, may include fingers and maximum ratio combining, as in a spread spectrum communication system. The intermediate signal A generally comprises a number of demodulated and combined symbols. The demodulated and combined symbols of the signal A are scaled by the circuit 122. The circuit 124 quantizes the symbols into n1 bits. The scaled and quantized symbols are saved into the deinterleaver memory 106. A certain number of second stage scaling variables (e.g., a number equal to frame length/N where N>1) are saved in the memory 146 of the control circuit 112. When the deinterleaver address generation circuit 142 generates the read address to be presented to the deinterleaver memory 126, the same address is presented to the circuit 144. The circuit 144 may implement a modular N operation to read out the corresponding second stage scaling value, which is applied to the deinterleaved data. The data are further quantized to n2 (where n2>n1) bits before being sent to channel decoder 110.

A scaling value may be calculated differently according to different signaling specifications. One implementation of the scaling levels may be where the scaling of the circuit 104 (e.g., a stage 1 scaling) keeps the noise level constant at the quantizer 124 to minimize quantization loss. The scaling of the circuit 108 (e.g., a stage 2 scaling) is applied such that the signals sent to the decoder 110 are represented as optimal variables. The quantization loss is less severe since the bit-width n2 is larger than the bit-width n1 by design.

In one example, an L path fading channel with additive Gaussian noise may be used. At the receiver 102, the signal DATA is first processed by the automatic gain control circuit 118, then by the demodulation and combiner circuit 120. The circuit 120 contains one or more fingers (to be described in more detail in connection with FIG. 3) to extract the corresponding signal power of each path. The 1-th finger output may be represented by the following equation EQ1:

$$y_k^{(l)} = A_k \sqrt{E_s} c_k a_k^{(l)} + A_k n_k^{(l)} \quad \text{EQ1}$$

Figure 3:
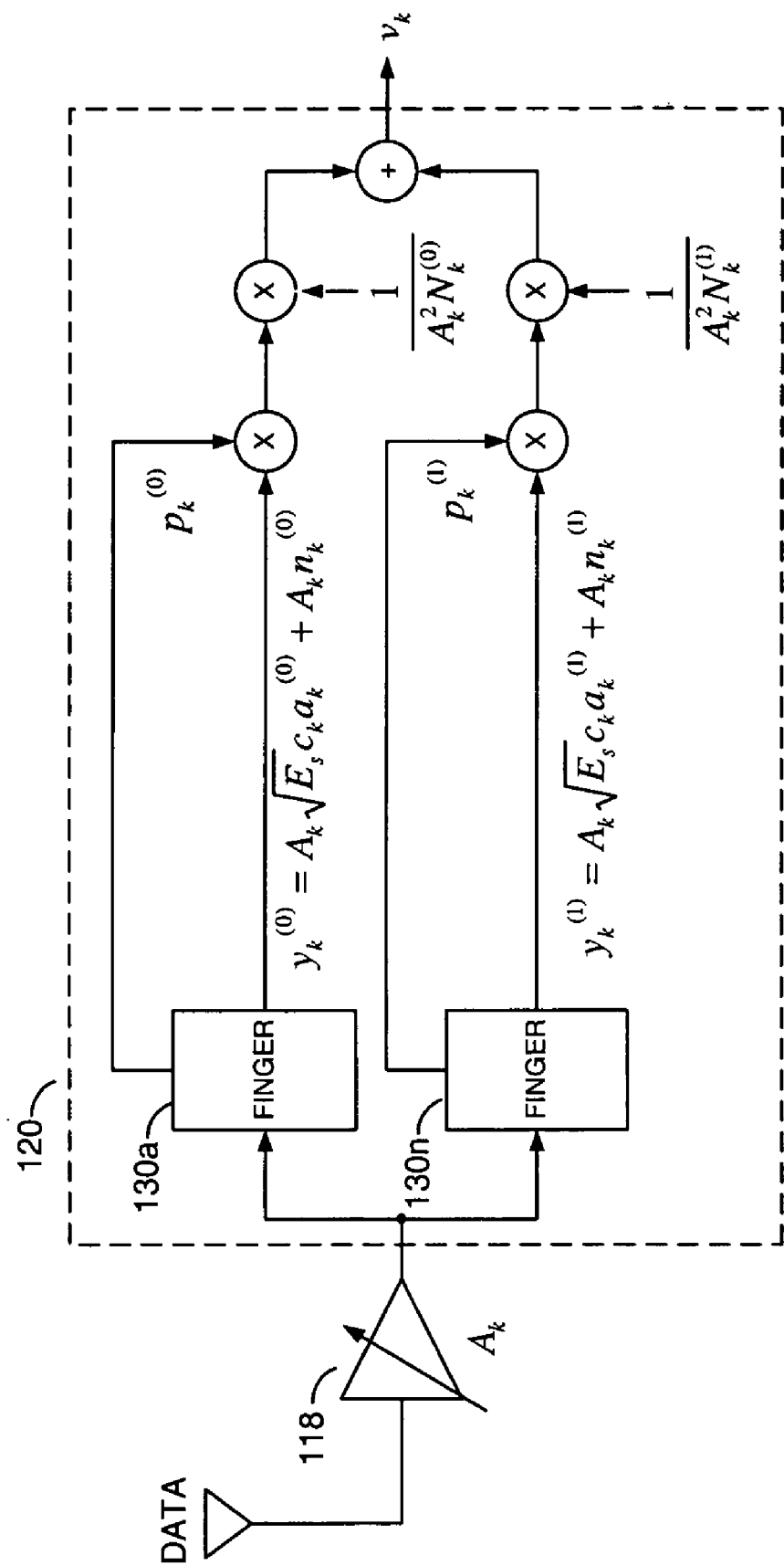
FIG. 3 is a more detailed diagram of the demodulator and combiner circuit.

Here l=0, 1, 2, . . . L−1 for L signal paths, k is the time index for symbol sequence where:

$A_k$ is the AGC gain at time k, $c_k$ is the coded symbol (+/−1), $E_s$ is coded symbol energy, $a_k^{(l)}$ is the channel gain for path l, $n_k^{(l)}$ is Gaussian noise with 0 mean and variance $N_0^{(l)}/2$ Referring to FIG. 3, a more detailed diagram of the circuit 120 is shown. The circuit 120 may be used to obtain a decision variable with L=2. The circuit 120 generally comprises a number of finger circuits 130*a*–130*n*. Each of the finger circuits 130*a*–130*n* generally operates according to the equation EQ1.

FIG. 3 illustrates an estimation of the channel gain $P_k$, and is usually obtained from the pilot channel (as in CDMA2000) or pilot symbols provided by the transmitter. The channel gain $P_k$ may be expressed with the following equation EQ2:

$$p_k^{(l)} = A_k \sqrt{E_p} a_k^{(l)} K + \tilde{n}_k \approx A_k \sqrt{E_p} a_k^{(l)} \quad \text{EQ2}$$

Here $E_p$ is the pilot power from a transmitter. When the average length for estimation is large enough, the estimation noise $\tilde{n}_k$ is negligible.

The output of the block 120 (e.g., $v_k$) or the intermediate signal A is proportional to an optimum decision variable (e.g., $r_k$ or a soft value) which may be derived from the maximum likelihood criteria, which may be expressed with the following equation EQ3:

$$r_k = s_k + n_k = \sum_{l=0}^{L-1} \frac{\sqrt{E_s}}{A_k N_0^{(l)}} a_k^{(l)} y_k^{(l)} = \sum_{l=0}^{L-1} \left[ \frac{E_s}{N_0^{(l)}} (a_k^l)^2 c_k + \frac{\sqrt{E_s}}{N_0^{(l)}} a_k^l n_l^k \right] \quad \text{EQ3}$$

The variable $v_k$ and the variable $r_k$ hold an approximately proportional relationship as shown in the following equation EQ4:

$$v_k = r_k \sqrt{\frac{E_p}{E_s}} \quad \text{EQ4}$$

Thus, the decision variable $v_k$ may be used as a decoder input for the same optimal performance. Due to the AGC gain that varies with channel fading, the noise variance of the optimal decision variable also varies even with constant channel noise variance. The first stage scaling is to normalize the noise variance of the decision variable to reduce quantization noise (or equivalently to reduce bit width requirement) at the following n1 bit quantizer. The scaling value is to be proportional as shown in the following equation EQ5:

$$S1 = 1 \Big/ \sqrt{\sum_{l=0}^{L-1} \frac{(a_k^{(l)})^2}{N_0^{(l)}}} \quad \text{EQ5}$$

Analysis and simulation show this normalization reduce the bit-width requirement of the quantization for the same quantization and decoding performance.

The quantized n1-bit values are saved into deinterleaver memory and deinterleaved. The deinterleaver output is scaled by the second stage scaling unit using the deinterleaved version of the reciprocal value of the equation EQ5 as shown in the following equation EQ6:

$$S2 = \sqrt{\sum_{l=0}^{L-1} \frac{(a_k^{(l)})^2}{N_0^{(l)}}} \quad \text{EQ6}$$

The values in the equations EQ5 and EQ6 change according to the channel condition. When the channel condition is estimated for every modulation symbol, the normalization values S1 and S2 are also updated once per soft value. However, for a high rate data transmission over a wireless channel where the modulated symbol may be as high as several Mega (e.g., million) symbols per second, the channel condition changes relatively slowly since the channel condition is mostly caused by motion in the receiver (e.g., Doppler spread).

For example, a mobile phone operating with a 2 GHz carrier frequency and traveling at 120 km/h will introduce a Doppler spread of about 220 Hz, which is 10000 times slower than 2.2 Msps data. The channel condition may be assumed to be unchanged for at least 1000 such symbols. When QPSK modulation is used, the number of scaling values can be 2000 times less than the number of soft values that are saved in the deinterleaver memory 106.

The values in equation EQ6 are normally saved in the second stage scaling buffer (block 146), where N in the block 144 is 2000 in one example. With such an implementation, the memory 106 may be approximately 2000 times smaller than a conventional deinterleaver memory in terms of address space. The value is accessed similarly by the deinterleaver address except that one value corresponds to N different deinterleaver addresses. The second stage scaling is followed by a n2-bit quantizer where n2 is generally larger than n1. The quantized value is fed into the decoder 110 for further processing.

The advantages of such a configuration may be illustrated as follows. The costs associated with implementing an increase in bit-width are different for the deinterleaver memory 106 than for the decoder 110. The size of the deinterleaver memory 106 is generally proportional to bit-width. For the decoder 110, the input bit-width only affects part of the decoder size. Also for some implementations of the decoder 110 (e.g., Viterbi with different repetition rate, turbo decoder that has feedback), the architecture of the decoder 110 already has most of the capability of handling higher number of bits at the input. By using lower number of bits for the deinterleaver memory 106 and a higher number of bits at the input of the decoder 110, both the cost and performance of the memory 106 may be optimized.

The quantized soft value carries information from two origins, the coded symbol, and the physical channel information (e.g., additive noise, fading, receiver front end distortion etc.). Although both need to be properly represented to achieve optimal performance, the relative slow rate of change of physical channels means these information may be treated the same for data over a period of time. This reduces the amount of data need to be stored and applied at the second stage of scaling and quantization.

In one example, the present invention may be used in a CDMA2000 or WCDAM mobile communication system. However, the present invention may be easily implemented in other designs.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first quantizer circuit configured to generate a first intermediate signal in response to (i) an input signal and (ii) a first scaling signal, wherein said first quantizer circuit has a first bit-width;
    a memory configured to (i) store said first intermediate signal and (ii) present a second intermediate signal, in response to an address signal; and
    a second quantizer circuit configured to generate an output signal in response to (i) said second intermediate signal and (ii) a second scaling signal, wherein said second quantizer circuit has a second bit-width greater than said first bit-width of said first quantizer.

2. The apparatus according to claim 1, wherein said first and second scaling signals are calculated in response to one or more physical conditions that change more slowly than one or more conditions of said input signal.

3. The apparatus according to claim 2, wherein said first and second scaling signals are applied to a number of soft values of received symbols.

4. The apparatus according to claim 1, further comprising:
    a control circuit configured to generate said first and second scaling signals in response to said input signal.

5. The apparatus according to claim 4, wherein said control circuit is further configured to generate said address signal.

6. The apparatus according to claim 1, wherein said input signal is generated with an automatic gain control circuit.

7. The apparatus according to claim 1, wherein said memory comprises a deinterleaver memory.

8. The apparatus according to claim 1, wherein said first quantizer circuit implements quantization at said first bit-width and scaling at a first scaling value.

9. The apparatus according to claim 1, wherein said second quantizer circuit implements quantization at said second bit-width and scaling at a second scaling value.

10. The apparatus according to claim 1, wherein said apparatus is implemented in a CDMA system.

11. An apparatus comprising:
    first quantizer means for generating a first intermediate signal by quantizing a product of (i) an input signal and (ii) a first scaling signal, wherein said first quantizer means has a first bit-width;
    means for (i) storing said first intermediate signal and (ii) presenting a second intermediate signal in response to an address signal; and
    second quantizer means for generating an output signal in response to (i) said second intermediate signal and (ii) a second scaling signal, wherein said second quantizer means has a second bit-width greater than said first bit-width of said first quantizer.

12. A method for quantizing a coded signal comprising the steps of:
    (A) generating a first intermediate signal by quantizing a product of (i) an input signal and (ii) a first scaling signal, wherein step (A) operates at a first bit-width;
    (B) storing said first intermediate signal and presenting a second intermediate signal, in response to an address signal; and
    (C) generating an output signal by quantizing (i) said second intermediate signal and (ii) a second scaling signal, wherein step (C) operates at a second bit-width greater than said first bit-width of step (A).

13. The method according to claim 12, wherein said first and second scaling signals are calculated in response to one or more physical conditions that change more slowly than one or more conditions of said input signal.

14. The method according to claim 13, wherein said first and second scaling signals are applied to a number of soft values of received symbols.

15. The method according to claim 12, further comprising:
    generating said first and second scaling signals in response to said input signal.

16. The method according to claim 12, further comrpsing:
    generating said address signal.

17. The method according to claim 12, wherein said input signal is generated with an automatic gain control circuit.

18. The method according to claim 12, wherein step (A) implements quantization at said first bit-width and scaling at a first scaling value.

19. The method according to claim 12, wherein step (C) implements quantization at said second bit-width and scaling at a second scaling value.

* * * * *